United States Patent
Okawa et al.

(10) Patent No.: US 7,199,205 B2
(45) Date of Patent: Apr. 3, 2007

(54) ORGANOPOLYSILOXANE-MODIFIED POLYSACCHARIDE AND PROCESS FOR PRODUCING THE SAME

(75) Inventors: Tadashi Okawa, Chiba Prefecture (JP); Masayuki Hayashi, Chiba Prefecture (JP)

(73) Assignee: Dow Corning Toray Silicone Company, Ltd., Chiyoda-Ku, Tokyo (JP)

(*) Notice: Subject to any disclaimer, the term of this patent is extended or adjusted under 35 U.S.C. 154(b) by 0 days.

(21) Appl. No.: 10/526,729

(22) PCT Filed: Sep. 8, 2003

(86) PCT No.: PCT/JP03/11458

§ 371 (c)(1),
(2), (4) Date: Mar. 4, 2005

(87) PCT Pub. No.: WO2004/024799

PCT Pub. Date: Mar. 25, 2004

(65) Prior Publication Data

US 2005/0250904 A1    Nov. 10, 2005

(30) Foreign Application Priority Data

Sep. 11, 2002  (JP) .............................. 2002-265218
Mar. 24, 2003  (JP) .............................. 2003-079260

(51) Int. Cl.
*C08G 81/00* (2006.01)
(52) U.S. Cl. ............................. 528/12; 528/21; 528/29; 528/41; 528/274; 527/311; 527/600; 524/714; 524/726
(58) Field of Classification Search ................ 528/12, 528/21, 29, 41, 274, 311, 600; 527/311, 527/600; 524/714, 726
See application file for complete search history.

(56) References Cited

U.S. PATENT DOCUMENTS 4,263,274 A * 4/1981 Kulkarni et al. ............... 514/54
5,015,700 A   5/1991 Herzig et al.
6,066,727 A * 5/2000 Yamamoto et al. ........ 536/124
2001/0021387 A1* 9/2001 Krammer et al. ........... 424/401
2005/0043365 A1* 2/2005 Yoshitake et al. .......... 514/345

FOREIGN PATENT DOCUMENTS

| EP | 0 444 921 A2 | 9/1991 |
|---|---|---|
| JP | 5-331291 | 12/1993 |
| JP | 7-070204 | 3/1995 |
| JP | 9-136901 | 5/1997 |
| JP | 11-349601 | 12/1999 |
| JP | 2002-146025 | 5/2002 |
| WO | WO 03/042283 | 5/2003 |

OTHER PUBLICATIONS

English language Abstract for JP 5-331291 extracted from espacenet.com database dated Jul. 28, 2005.
English language Abstract for JP 7-070204-217040 extracted from espacenet.com database dated Jul. 28, 2005.
English language Abstract for JP 9-136901 extracted from espacenet.com database dated Jul. 28, 2005.
English language Abstract for JP 11-349601 extracted from espacenet.com database dated Jul. 28, 2005.
English language Abstract for JP 2002-146025 extracted from espacenet.com database dated Jul. 28, 2005.

* cited by examiner

*Primary Examiner*—Irina S. Zemel
(74) *Attorney, Agent, or Firm*—Howard & Howard Attorneys, P.C.

(57) ABSTRACT

An organopolysiloxane-modified polysaccharide prepared by esterification reacting (A) an organopolysiloxane having residual carboxylic anhydride groups and (B) a polysaccharide having hydroxyl groups, wherein the organopolysiloxane is bonded to the polysaccharide through half ester groups, and a process for the preparation of organopolysiloxane-modified polysaccharide, in which component (A) and component (B) are subjected to an esterification reaction in the presence of (C) a non-protonic polar solvent. The organopolysiloxane-modified polysaccharide comprising polysaccharide and organopolysiloxane bonded thereto through half ester groups is novel. The process for the preparation of organopolysiloxane-modified polysaccharide permits introduction of organopolysiloxane into polysaccharide at a high introduction ratio.

12 Claims, No Drawings

ORGANOPOLYSILOXANE-MODIFIED POLYSACCHARIDE AND PROCESS FOR PRODUCING THE SAME

RELATED APPLICATIONS

This application claims priority to and all the advantages of International Application No. PCT/JP2003/11458, filed on Sep. 8, 2003, which claims priority to Japanese Patent Application Nos. 2002-265218, filed on Sep. 11, 2002, and 2003-76260, filed on Mar. 24, 2003.

TECHNICAL FIELD

The present invention relates to organopolysiloxane-modified polysaccharides and to a process for their preparation. In particular, it relates to novel polysaccharides, in which the organopolysiloxanes are bonded to the polysaccharides through half ester groups, and to a process for the preparation of organopolysiloxane-modified polysaccharides that permits introduction of organopolysiloxanes in the polysaccharides at a high introduction ratio.

BACKGROUND ART

Polysaccharides bonded to organopolysiloxane are taught in Japanese Unexamined Patent Application Publication No. Hei 7-70204. The suggested preparation processes include, for instance, a process, in which cationized cellulose, hydroxyethyl cellulose, or chitosan are reacted with a dimethylpolysiloxane having one of the ends of the molecular chain blocked by a glycidoxypropyl group. In addition, a process, in which an isocyanate-containing organopolysiloxane is reacted with cellulose or cellulose derivatives has been offered in Japanese Unexamined Patent Application Publication No. Hei 9-136901, and a process, in which a diorganopolysiloxane having one of the ends of the molecular chain blocked by an epoxycyclohexylethyl group is reacted with a polysaccharide derivative soluble in organic solvents and containing carboxyl groups are discussed in Japanese Unexamined Patent Application Publication No. Hei 11-349601.

However, the problem with many of the above-described processes is the low ratio of organopolysiloxane introduced into the polysaccharides. This results from the low reactivity between the starting organopolysiloxane selected and the polysaccharides. While processes for isocyanate-containing organopolysiloxane can overcome this, they are disadvantageous because of the need to use toxic compounds for increased reactivity.

As a result of investigations into methods that could be used to prepare organopolysiloxane-modified polysaccharides with a high ratio of introduction of organopolysiloxane without using toxic compounds such as isocyanate-containing organopolysiloxanes, etc., the present inventors found that hydroxyl groups in polysaccharides can undergo an esterification reaction with organopolysiloxanes containing residual carboxylic anhydride groups.

Thus, the present invention provides novel polysaccharides, in which the organopolysiloxanes are bonded to the polysaccharides through ester groups, and a process for the preparation of organopolysiloxane-modified polysaccharides that permits introduction of organopolysiloxanes into polysaccharides at a high introduction ratio.

DISCLOSURE OF THE INVENTION

The organopolysiloxane-modified polysaccharide of the present invention is prepared by esterfication reacting (A) an organopolysiloxane having residual carboxylic anhydride groups and (B) a polysaccharide having hydroxyl groups, wherein the organopolysiloxane is bonded to the polysaccharide through half ester groups.

The process for the preparation of organopolysiloxane-modified polysaccharide of the present invention comprises esterification reacting;

(A) an organopolysiloxane having residual carboxylic anhydride groups, and (B) a polysaccharide having hydroxyl groups, in the presence of (C) a non-protonic polar solvent.

DETAILED DESCRIPTION OF THE INVENTION

Component (A) in the present invention is an organopolysiloxane having residual carboxylic anhydride groups. Component (A) is exemplified by organopolysiloxanes represented by the average unit formula of $R^1_a R^2_b SiO_{(4-a-b)/2}$. In the formula, $R^1$ is a residual carboxylic anhydride group, exemplified by residual carboxylic anhydride groups represented by the general formula:

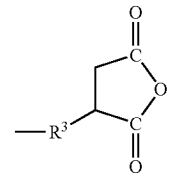

residual carboxylic anhydride groups represented by the general formula:

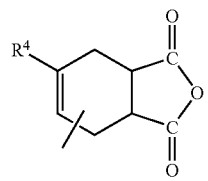

residual carboxylic anhydride groups represented by the general formula:

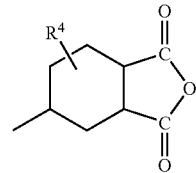

residual carboxylic anhydride groups represented by the general formula:

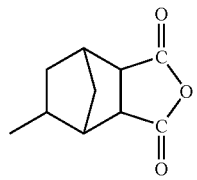

and residual carboxylic anhydride groups represented by the general formula:

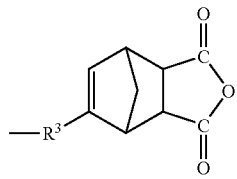

Group $R^3$ in the above-mentioned residual carboxylic anhydride groups is a divalent hydrocarbon group, exemplified by methylene, ethylene, propylene, or another alkylene groups; phenylene, xylylene, tolylene, or another arylene groups; methylenephenylene, ethylenephenylene, or another alkylene-arylene groups, with alkylene groups being preferable. In addition, group $R^4$ in the above-mentioned residual carboxylic anhydride groups is a hydrogen atom or alkyl group, with the alkyl groups of $R^4$ exemplified by methyl, ethyl, propyl, pentyl, and hexyl. Additionally, group $R^2$ in the formulas above is a hydrogen atom or monovalent hydrocarbon group, with the monovalent hydrocarbon groups of $R^2$ exemplified by methyl, ethyl, propyl, butyl, pentyl, and other alkyl groups; vinyl, allyl, butenyl, pentenyl, hexenyl, and other alkenyl groups; phenyl, tolyl, xylyl, and other aryl groups; benzyl, phenetyl, and other aralkyl groups, with alkyl and aryl groups being preferable and methyl and phenyl being especially preferable. In addition, although group $R^2$ in the formulas above is a hydrogen atom or monovalent hydrocarbon group, hydrogen atoms cannot be used for all groups $R^2$. Also, the subscripts "a" and "b" in the formulas above are numbers satisfying the conditions $0<a\leq 1$ and $0<b\leq 3$, respectively, as well as satisfying the condition $0<a+b<4$. In the formulas above, a+b is preferably a number that satisfies the condition $0.5<a+b<3$, and especially preferably, $0.8<a+b<2.5$.

There are no limitations concerning component (A) in terms of its the molecular structure, which is exemplified by linear, partially branched linear, branched, cyclic, and dendritic structures, with linear structures being preferable. Such organopolysiloxanes are exemplified by organopolysiloxanes represented by the general formula:

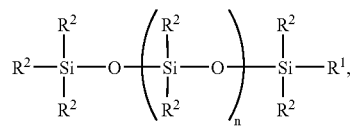

organopolysiloxanes represented by the general formula:

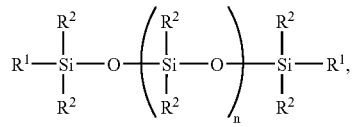

and organopolysiloxanes represented by the general formula:

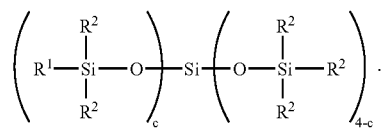

Group $R^1$ in the formulas above are residual carboxylic anhydride groups exemplified by the same groups as those mentioned above. In addition, group $R^2$ in the formulas above is a hydrogen atom or monovalent hydrocarbon group, with the monovalent hydrocarbon groups of $R^2$ exemplified by the same groups as those mentioned above. In addition, although group $R^2$ in the formulas above is a hydrogen atom or monovalent hydrocarbon group, hydrogen atoms cannot be used for all groups $R^2$. In addition, the subscript "n" in the formulas above is an integer of 0 or greater. Also, the subscript "c" in the formula above is an integer of 1 to 4.

Component (B) is a polysaccharide having hydroxyl groups. Component (B) can be any polysaccharide having hydroxy groups, but typically is chosen to be able to be used in the esterification reaction with the above-described component (A). There are no limitations concerning the binding position of the hydroxyl groups in component (B). Component (B) is exemplified by cellulose, hemicellulose, and other ligneous polysaccharides; gum arabic, gum tragacanth, adhesive juice of Hibiscus manihot L., and other adhesive substances derived from plants; pectin, starch, konjak flour paste, mannan, and other fruit flesh and rhizome-derived polysaccharides; guar gum, locust bean gum, tamarind gum, quince seed gum, and other polysaccharides obtained from legumes; carrageenan, agar-agar, and other polysaccharides from seaweed; xanthan gum, dextran, pullulan, levan, and other polysaccharide produced by microorganisms; chitin, hyaluronic acid, and other polysaccharides of animal origin; and polysaccharide derivatives obtained by subjecting some of the hydroxyl groups of these polysaccharides to carboxymethylation, sulfation, addition of alkylene oxides, such as ethylene oxide and propylene oxide, acylation, cationation, and molecular weight reduction.

In the organopolysiloxane-modified polysaccharides of the present invention, the organopolysiloxane residual groups supplied by the above-described component (A) are bonded to the polysaccharide through half ester groups. The half ester groups are exemplified by half ester groups represented by the general formula:

half ester groups represented by the general formula:

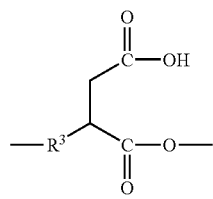

half ester groups represented by the general formula:

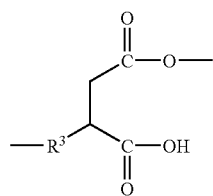

half ester groups represented by the general formula:

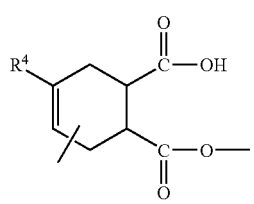

half ester groups represented by the general formula:

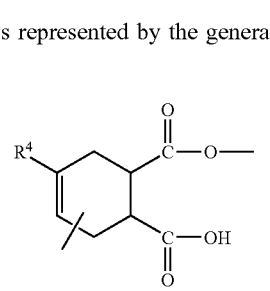

half ester groups represented by the general formula:

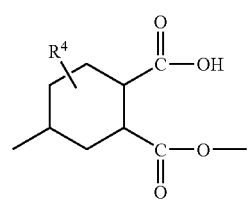

half ester groups represented by the general formula:

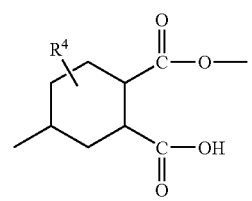

half ester groups represented by the general formula:

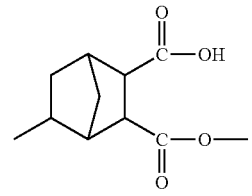

half ester groups represented by the general formula:

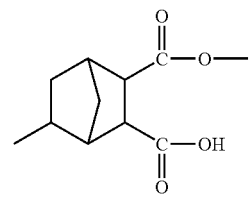

half ester groups represented by the general formula:

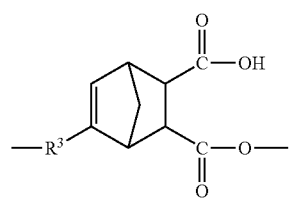

and half ester groups represented by the general formula:

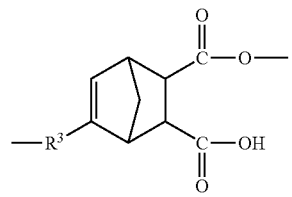

Group $R^3$ in the formulas above is a divalent hydrocarbon group exemplified by the same groups as those mentioned above. In addition, group $R^4$ in the formulas above is a hydrogen atom or alkyl group, with the alkyl groups exemplified by the same groups as those mentioned above.

In the process of the present invention, (A) the carboxylic anhydride groups of an organopolysiloxane and (B) the hydroxyl groups of a polysaccharide are subjected to an esterification reaction in the presence of (C) a non-protonic polar solvent. There are no limitations concerning component (A) so long as it is an organopolysiloxane having residual carboxylic anhydride groups in the molecule. More specifically, it is exemplified by organopolysiloxanes represented by the average unit formula:

$$R^1{}_a R^2{}_b SiO_{(4-a-b)/2}$$

In the formula above, group $R^1$ is a residual carboxylic anhydride group exemplified by the same groups as those mentioned above. Also, group $R^2$ in the formula above is a hydrogen atom or monovalent hydrocarbon group, with the monovalent hydrocarbon groups of $R^2$ exemplified by the same groups as those mentioned above. In addition, although $R^2$ in the formula above is a hydrogen atom or monovalent hydrocarbon group, hydrogen atoms cannot be used for all $R^2$. Also, the subscripts "a" and "b" in the formula above are numbers satisfying the conditions $0<a \leq 1$ and $0<b \leq 3$, respectively, as well as satisfying the condition $0<a+b<4$. In the formula above, $a+b$ is preferably a number that satisfies the condition $0.5<a+b<3$, and especially preferably, $0.8<a+b<2.5$.

There are no limitations concerning the molecular structure of component (A), which is exemplified by linear, partially branched linear, branched, cyclic, and dendritic structures, with linear structures being preferable. Component (A) is exemplified by the same organopolysiloxanes as those mentioned above.

Process used for preparing component (A) are known in the art and are exemplified by the following.

(1) A process, in which an organopolysiloxane containing silicon-bonded hydrogen atoms is subjected to an addition reaction with norbornenedicarboxylic anhydride (see U.S. Pat. No. 4,381,196).

(2) A process, in which a 1,3-bis(dimethylphenyl)disiloxane derivative is subjected to oxidation (see Japanese Unexamined Patent Application Publication No. Sho 63-270690 and Japanese Unexamined Patent Application Publication No. Sho 63-316790).

(3) A process, in which an organopolysiloxane containing cyclopentadienyl groups is subjected to a Diels-Alder reaction with maleic anhydride (see Chemical Abstracts, 72, 32777 (1970)).

(4) A process, in which an organopolysiloxane containing silicon-bonded hydrogen atoms is subjected to an addition reaction with 1,4-dichlorobutyne in the presence of a platinum catalyst and the reaction product is reduced with zinc to 2-silyl-substituted-1,3-butadiene, which is subsequently subjected to a Diels-Alder reaction with maleic anhydride (see European Pat. No. 176085).

(5) A process, in which an organopolysiloxane containing silicon-bonded hydrogen atoms is subjected to an addition reaction with alkyl alcohol in the presence of a platinum catalyst and the reaction product is heated with maleic anhydride, generating a diene by means of a dehydration reaction, which is followed by a Diels-Alder reaction (see Japanese Unexamined Patent Application Publication No. Hei 3-109428).

(6) A process, in which a butadienyl-containing organopolysiloxane is obtained by reacting 2-halogenated magnesium-1,3-butadiene with a halosilyl-containing organopolysiloxane and the product is subjected to a Diels-Alder reaction with maleic anhydride (Japanese Unexamined Patent Application Publication No. Hei 4-211091).

(7) A process, in which cyclopentadienylalkyl-containing disiloxane is subjected to a Diels-Alder reaction with maleic anhydride (Japanese Unexamined Patent Application Publication No. Hei 4-89492).

(8) A process, in which an organopolysiloxane containing silicon-bonded hydrogen atoms is subjected to an addition reaction with an alkenyl-containing succinic anhydride (Japanese Unexamined Patent Application Publication No. Hei 5-331291).

In addition, there are no limitations concerning component (B) so long as it is a polysaccharide having hydroxyl groups in the molecule. Specifically, it is exemplified by the same polysaccharides as the ones mentioned above, with cationized cellulose represented by the general formula:

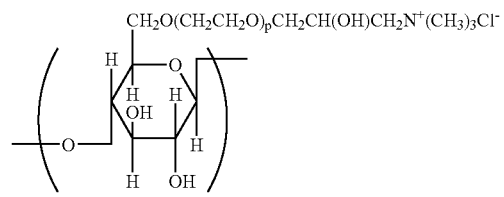

being the most preferable compound. In the formula above, the subscripts "p" and "q" are numbers respectively satisfying the conditions $0 \leq p \leq 2000$ and $5 \leq q \leq 3000$.

Typically, due to the low compatibility of component (A) and component (B), in the preparative process of the present invention, the esterification reaction is carried out in the presence of (C) a non-protonic polar solvent in order to enhance their compatibility and improve reactivity. Component (C) is exemplified by N,N-dimethylacetamide, N,N-dimethylformamide, dimethyl sulfoxide, and hexamethylphosphortriamide. In addition, component (C) can be used in combination with other non-protonic organic solvents that essentially do not react with component (B) and component (A). The non-protonic organic solvents are exemplified by benzene, toluene, xylylene, and other aromatic hydrocarbons; hexane, pentane, and other aliphatic hydrocarbons; tetrahydrofuran, diethyl ether, and other ethers; acetone, methyl ethyl ketone, methyl isobutyl ketone, and other ketones.

Additionally, in the preparative process of the present invention, there are no limitations concerning the reaction temperature. Although the esterification reaction can be carried out at room temperature, heating is preferable. In case of heating, the reaction temperature should preferably be in the range of from 50° C. to 150° C., and especially preferably, in the range of from 60° C. to 110° C. If component (B) contains a large amount of moisture, the moisture may react with the carboxylic anhydride groups in component (A) and its reactivity with the hydroxyl groups in component (B) may decrease. For this reason, in the preparative process of the present invention, it is desirable to remove as much moisture from component (B) as possible in advance.

In the preparative process of the present invention, after subjecting component (A) and component (B) to an esterification reaction, an organic solvent, which is a good solvent for unreacted component (A) and a poor solvent for unreacted component (B) and the reaction product, is introduced in the system to precipitate the reaction product and, after washing with solvent, the unreacted component (A) can be removed by filtration or other methods and an organopolysiloxane-modified polysaccharide, i.e. the target reaction product, can be separated by drying under heating and reduced pressure.

EXAMPLES

The organopolysiloxane-modified polysaccharides of the present invention and the process of their preparation will be now explained in detail by referring to application examples.

Reference Example 1

A complex of platinum and 1,3-divinyltetramethyldisiloxane (an amount sufficient to provide 5 ppm of platinum metal relative to the total weight of the reaction starting materials) was added to 25 g of dimethylpolysiloxane represented by the formula:

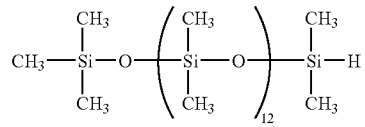

(silicon-bonded hydrogen atoms=24.1 millimol) under a nitrogen atmosphere, the mixture was heated to 80° C. and 3.38 g (24.1 millimol) of allylsuccinic anhydride were added thereto in a dropwise manner. Upon termination of the dropwise addition, the mixture was stirred for 5 hours at a temperature within the range of from 80° C. to 100° C. Subsequently, 27.2 g of a polymer were obtained by eluting low-boiling fractions by heating under reduced pressure. A nuclear magnetic resonance analysis (referred to as NMR below) and infrared spectroscopy analysis (referred to as IR below) of the polymer found that it was a dimethylpolysiloxane represented by the formula:

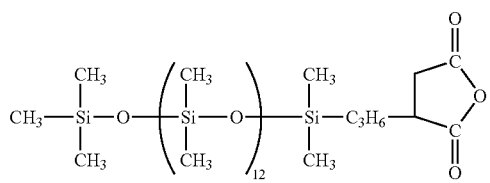

Reference Example 2

A complex of platinum and 1,3-divinyltetramethyldisiloxane (an amount sufficient to provide 5 ppm of platinum metal relative to the total weight of the reaction starting materials) was added to 25 g of dimethylpolysiloxane represented by the formula:

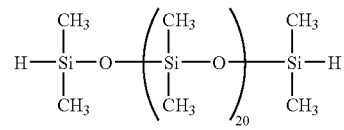

(silicon-bonded hydrogen atoms=30.5 millimol) under a nitrogen atmosphere, the mixture was heated to 80° C. and 3.38 g (30.5 millimol) of allylsuccinic anhydride were added thereto in a dropwise manner. Upon termination of the dropwise addition, the mixture was stirred for 5 hours at a temperature within the range of from 80° C. to 100° C. Subsequently, 27.2 g of a polymer were obtained by eluting low-boiling fractions by heating under reduced pressure. An NMR and IR analysis of the polymer found that it was a dimethylpolysiloxane represented by the formula:

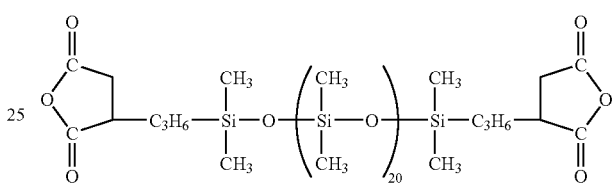

Reference Example 3

A complex of platinum and 1,3-divinyltetramethyldisiloxane (an amount sufficient to provide 5 ppm of platinum metal relative to the total weight of the reaction starting materials) was added to 2.23 g of 2-methyl-3-butyn-2-ol (26.5 millimol) under a nitrogen atmosphere, the mixture was heated to 100° C. and 25 g (silicon-bonded hydrogen atoms=24.1 millimol) of dimethylpolysiloxane represented by the formula:

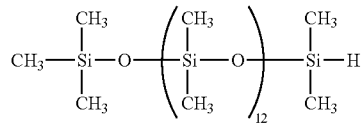

were added thereto in a dropwise manner. Upon termination of the dropwise addition, the mixture was stirred for 1.5 hours at 110° C., whereupon it was determined by an IR analysis that the absorption of the silicon-bonded hydrogen atoms had disappeared. Subsequently, excess 2-methyl-3-butyn-2-ol and other low-boiling fractions were eluted by heating under reduced pressure, yielding 26.1 g of polymer. An NMR and IR analysis of the polymer found that it was a dimethylpolysiloxane mixture made up of a dimethylpolysiloxane represented by the formula:

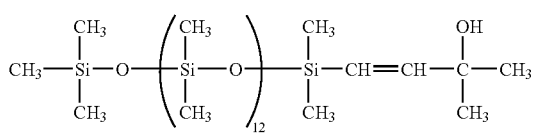

and a dimethylpolysiloxane represented by the formula:

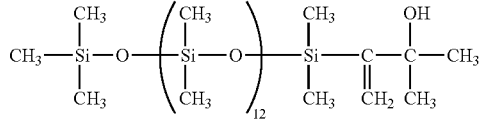

combined in a molar ratio of 7:3.

Next, 20 g of the dimethylpolysiloxane mixture, 1.86 g (19.0 millimol) of maleic anhydride, 0.55 milligrams of sulfuric acid, and 20 milliliters of toluene were introduced in the system and reacted for 4 hours at a temperature within the range of from 140° C. to 150° C. while subjecting the water produced in the reaction to azeotropic dehydration. After cooling, the solution was neutralized with 1.1 milligrams of triethylamine and the salts of neutralization were filtered off along with crystallized unreacted maleic anhydride. Then, 20.9 g of a polymer were obtained by eluting the low-boiling fractions of the filtrate by heating under reduced pressure. An NMR and IR analysis of the polymer found that it was a dimethylpolysiloxane mixture made up of a dimethylpolysiloxane represented by the formula:

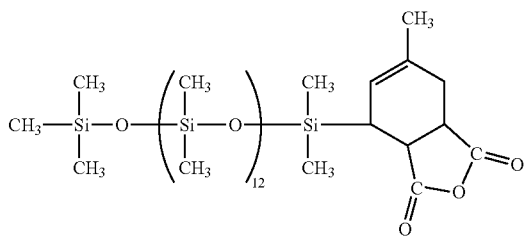

and a dimethylpolysiloxane represented by the formula:

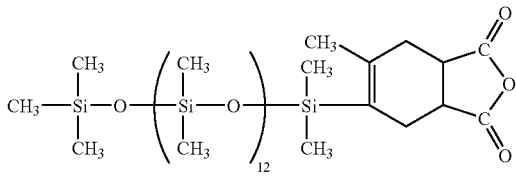

combined in a molar ratio of 7:3.

Reference Example 4

A complex of platinum and 1,3-divinyltetramethyldisiloxane (an amount sufficient to provide 5 ppm of platinum metal relative to the total weight of the reaction starting materials) was added to 2 g of 2-methyl-3-butyn-2-ol (23.8 millimol) under a nitrogen atmosphere. The mixture was heated to 100° C. and 17.7 g dimethylpolysiloxane represented by the formula:

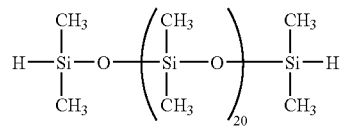

(silicon-bonded hydrogen atoms=21.6 millimol) were added thereto in a dropwise manner. Upon termination of the dropwise addition, the mixture was stirred for 1.5 hours at 110° C., whereupon it was determined by an IR analysis that the absorption of the silicon-bonded hydrogen atoms had disappeared. Subsequently, excess 2-methyl-3-butyn-2-ol and other low-boiling fractions were eluted by heating under reduced pressure, yielding 19.0 g of polymer. An NMR and IR analysis of the polymer found that it was a mixture of dimethylpolysiloxanes represented by the formula:

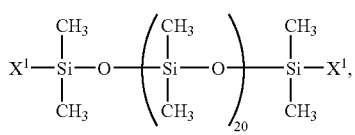

in which groups $X^1$ were groups represented by the formula:

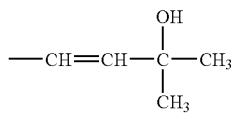

and groups represented by the formula:

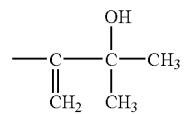

in a molar ratio of 7:3.

Next, 15 g of the dimethylpolysiloxane mixture, 3.26 g (33.2 millimol) of maleic anhydride, 0.55 milligrams of sulfuric acid, and 6.5 milliliters of xylene were introduced in the system and reacted for 4 hours at a temperature within the range of from 140° C. to 150° C. while subjecting the water produced in the reaction to azeotropic dehydration. After cooling, the solution was neutralized with 1.1 milligrams of triethylamine and the salts of neutralization were filtered off along with crystallized unreacted maleic anhydride. The, 15.2 g of a polymer were obtained by eluting the low-boiling fractions of the filtrate by heating under reduced pressure. An NMR and IR analysis of the polymer found that it was a mixture of dimethylpolysiloxanes represented by the formula:

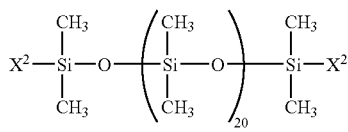

in which groups $X^2$ were residual carboxylic anhydride groups represented by the formula:

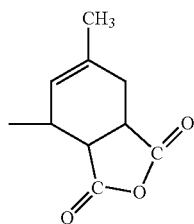

and residual carboxylic anhydride groups represented by the formula:

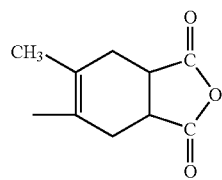

in a molar ratio of 7:3.

Reference Example 5

An equilibration reaction was conducted by introducing 14.8 g (50 millimol) of octamethylcyclotetrasiloxane, 1.12 g (8.3 millimol) of 1,1,3,3-tetramethyldisiloxane, 1.35 g (8.3 millimol) of hexamethyldisiloxane, and 2 wt % of activated clay serving as a catalyst in the system under a nitrogen atmosphere and subjecting the mixture to agitation for 2 hours under heating at 40° C., followed by another two hours of agitation under heating at 65° C. Subsequently, after cooling the mixture to room temperature, the activated clay was filtered off, yielding 16.5 g of polymer. It was found that the polymer was a mixture of dimethylpolysiloxanes (content of silicon-bonded hydrogen atoms=0.087 wt %) represented by the average formula:

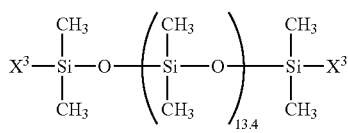

in which groups $X^3$ were made up of hydrogen atoms and methyl groups.

Reference Example 6

A complex of platinum and 1,3-divinyltetramethyldisiloxane (an amount sufficient to provide 5 ppm of platinum metal relative to the total weight of the reaction starting materials) was added to 22.9 g of of the dimethylpolysiloxane mixture prepared in Reference Example 5 (silicon-bonded hydrogen atoms=20 millimol), the mixture was heated to 80° C. and 2.80 g (20 millimol) of allylsuccinic anhydride were added thereto in a dropwise manner. Upon termination of the dropwise addition, the mixture was stirred for 5 hours at a temperature within the range of from 80° C. to 100° C. Subsequently, 24.2 g of a polymer were obtained by eluting low-boiling fractions by heating under reduced pressure.

An NMR and IR analysis of the polymer found that it was a mixture of dimethylpolysiloxanes represented by the average formula:

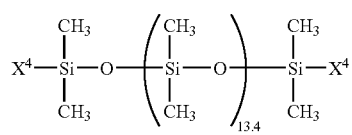

in which groups $X^4$ were made up of methyl groups and residual carboxylic anhydride groups represented by the formula:

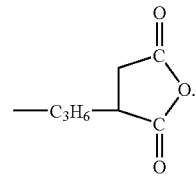

Reference Example 7

A complex of platinum and 1,3-divinyltetramethyldisiloxane (an amount sufficient to provide 5 ppm of platinum metal relative to the total weight of the reaction starting materials) was added to 1.85 g of 2-methyl-3-butyn-2-ol. The mixture was heated to 100° C. and 22.9 g (silicon-bonded hydrogen atoms=20 millimol) of the dimethylpolysiloxane mixture prepared in Reference Example 5 were added thereto in a dropwise manner. Upon termination of the dropwise addition, the mixture was stirred for 1.5 hours at 110° C., whereupon it was determined by an IR analysis that the absorption of the silicon-bonded hydrogen atoms had disappeared. Subsequently, 23.1 g of a polymer were obtained by eluting excess 2-methyl-3-butyn-2-ol and other low-boiling fractions by heating under reduced pressure. An NMR and IR analysis of the polymer found that it was a mixture of dimethylpolysiloxanes represented by the average formula:

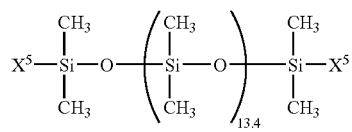

in which groups $X^5$ were made up of methyl groups, groups represented by the formula:

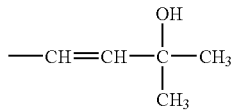

and groups represented by the formula:

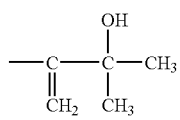

Subsequently, 22 g of the dimethylpolysiloxane mixture, 1.86 g (19 millimol) of maleic anhydride, 0.55 milligrams of sulfuric acid, and 6.5 milliliters of xylylene were introduced in the system and reacted for 4 hours at a temperature within the range of from 140° C. to 150° C. while subjecting the water produced in the reaction to azeotropic dehydration. After cooling, the solution was neutralized with 1.1 milligrams of triethylamine and the salts of neutralization were filtered off along with crystallized unreacted maleic anhydride. 15.2 g of a polymer were obtained by eluting the low-boiling fractions of the filtrate by heating under reduced pressure. An NMR and IR analysis of the polymer found that it was a mixture of dimethylpolysiloxanes represented by the average formula:

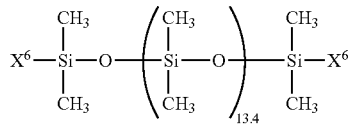

in which groups $X^6$ were made up of methyl groups, residual carboxylic anhydride groups represented by the formula:

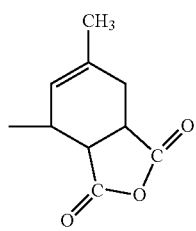

and residual carboxylic anhydride groups represented by the formula:

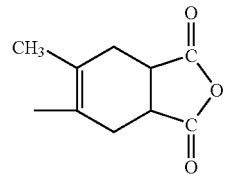

Reference Example 8

A complex of platinum and 1,3-divinyltetramethyldisiloxane (an amount sufficient to provide 50 ppm of platinum metal relative to the total weight of the reaction starting materials) and toluene (an amount sufficient to provide a concentration of 5 wt % relative to the total weight of the starting materials) were added to 11.4 g (silicon-bonded hydrogen atoms=10 millimol) of the dimethylpolysiloxane mixture prepared in Reference Example 5. The mixture was heated to 100° C. and 1.72 g (10.5 millimol) of 5-norbornene-2,3-dicarboxylic anhydride were added thereto in a dropwise manner. Upon termination of the dropwise addition, the mixture was stirred for 7 hours at a temperature within the range of from 130° C. to 150° C. Subsequently, 12.4 g of a polymer were obtained by means of eluting low-boiling fractures by heating under reduced pressure and filtering off unreacted 5-norbornene-2,3-dicarboxylic anhydride. An NMR and IR analysis of the polymer found that it was a mixture of dimethylpolysiloxanes represented by the average formula:

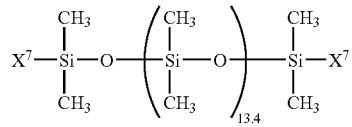

in which groups $X^7$ were made up of methyl groups and residual carboxylic anhydride groups represented by the formula:

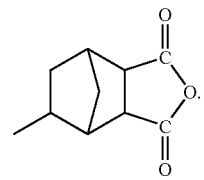

Reference Example 9

A complex of platinum and 1,3-divinyltetramethyldisiloxane (an amount sufficient o provide 5 ppm of platinum metal relative to the total weight of the starting materials) as added to 19 g of organopolysiloxane represented by the formula:

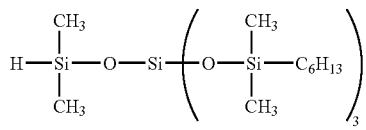

(silicon-bonded hydrogen atoms=32.7 millimol) under a nitrogen atmosphere. Next, the mixture was heated to 80° C. and 4.6 g (32.7 millimol) of allylsuccinic anhydride were added thereto in a dropwise manner. Upon termination of the dropwise addition, the mixture was stirred for 5 hours at a temperature within the range of from 80° C. to 100° C. Subsequently, 12.8 g of a polymer were obtained by eluting low-boiling fractions by heating under reduced pressure. An NMR and IR analysis of the polymer found that it was an organopolysiloxane represented by the formula:

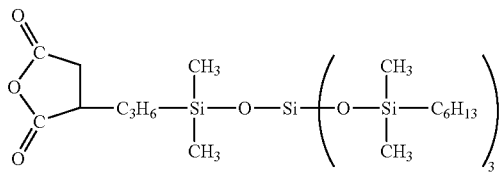

Application Example 1

0.05 g of the dimethylpolysiloxane prepared in Reference Example 1 (residual carboxylic anhydride groups=0.043 millimol), 1.0 g of dried cationized cellulose represented by the formula:

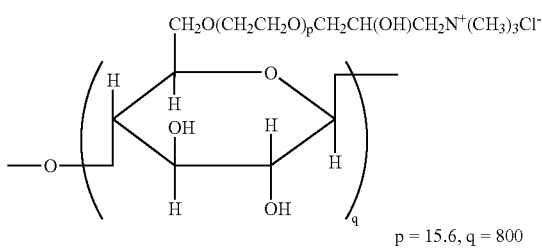

p = 15.6, q = 800 and 10 g of N,N-dimethylacetamide were mixed and the mixture was stirred for 3 hours at 40° C. After cooling, the mixture was combined with 20 milliliters of isopropyl alcohol and filtered. Subsequently, 0.99 g of a white powder were obtained by thoroughly washing the filter cake with isopropyl alcohol and drying it in a vacuum oven. An IR analysis of the white powder found that peaks in the vicinity of 1790 cm$^{-1}$ and 1870 cm$^{-1}$, which were indicative of the residual carboxylic anhydride groups in the dimethylpolysiloxane prepared in Reference Example 1, had disappeared and new peaks appeared in the vicinity of 1730 cm$^{-1}$ and 1620 cm$^{-1}$, confirming that the product was a dimethylpolysiloxane-modified cationized cellulose, in which the dimethylpolysiloxane was bonded to the cationized cellulose through half ester groups represented by the formula:

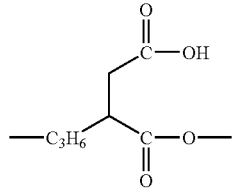

and/or half ester groups represented by the formula:

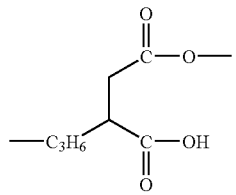

In addition, fluorescent X-ray analysis found that the dimethylpolysiloxane content in the dimethylpolysiloxane-modified cationized cellulose was 2.71 wt % and the degree of substitution, defined as the number of dimethylpolysiloxane units introduced per 1 glucose unit, was 2.0×10$^{-2}$.

Application Example 2

0.99 g of a white powder were obtained in the same manner as in Application Example 1, except that 0.05 g (carboxylic anhydride groups=0.053 millimol) of the dimethylpolysiloxane prepared in Reference Example 2 were used in Application Example 1 instead of the dimethylpolysiloxane prepared in Reference Example 1. An IR analysis of the white powder found that peaks in the vicinity of 1790 cm$^{-1}$ and 1870 cm$^{-1}$, which were indicative of the residual carboxylic anhydride groups in the dimethylpolysiloxane prepared in Reference Example 2, had disappeared and new peaks appeared in the vicinity of 1730 cm$^{-1}$ and 1620 cm$^{-1}$, confirming that the product was a dimethylpolysiloxane-modified cationized cellulose, in which the dimethylpolysiloxane was bonded to the cationized cellulose through half ester groups represented by the formula:

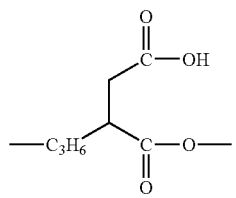

and/or half ester groups represented by the formula:

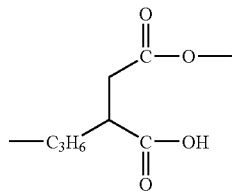

Fluorescent X-ray analysis found that the dimethylpolysiloxane content in the dimethylpolysiloxane-modified cationized cellulose was 6.14 wt % and the degree of substitution was $2.9 \times 10^{-2}$.

Application Example 3

First, 0.99 g of a white powder were obtained in the same manner as in Application Example 1, except that 0.05 g (carboxylic anhydride groups=0.041 millimol) of the dimethylpolysiloxane mixture prepared in Reference Example 3 were used in Application Example 1 instead of the dimethylpolysiloxane prepared in Reference Example 1. An IR analysis of the white powder found that peaks in the vicinity of 1790 cm$^{-1}$ and 1870 cm$^{-1}$, which were indicative of the residual carboxylic anhydride groups in the dimethylpolysiloxane mixture prepared in Reference Example 3, had disappeared and new peaks appeared in the vicinity of 1730 cm$^{-1}$ and 1620 cm$^{-1}$, confirming that the product was a dimethylpolysiloxane-modified cationized cellulose, in which the dimethylpolysiloxane was bonded to the cationized cellulose through half ester groups represented by the formula:

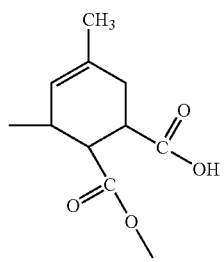

and/or half ester groups represented by the formula:

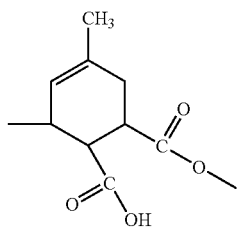

as well as by half ester groups represented by the formula:

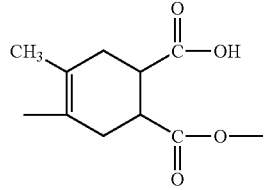

and/or half ester groups represented by the formula:

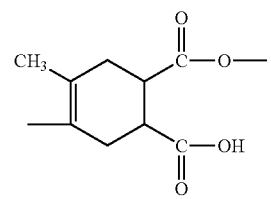

Fluorescent X-ray analysis found that the dimethylpolysiloxane content in the dimethylpolysiloxane-modified cationized cellulose was 0.69 wt % and the degree of substitution was $4.4 \times 10^{-3}$.

Application Example 4

First, 0.99 g of a white powder were obtained in the same manner as in Application Example 1, except that 0.05 g (residual carboxylic anhydride groups=0.051 millimol) of the dimethylpolysiloxane mixture prepared in Reference Example 4 were used in Application Example 1 instead of the dimethylpolysiloxane prepared in Reference Example 1. An IR analysis of the white powder found that peaks in the vicinity of 1790 cm$^{-1}$ and 1870 cm$^{-1}$, which were indicative of the residual carboxylic anhydride groups in the dimethylpolysiloxane mixture prepared in Reference Example 4, had disappeared and new peaks appeared in the vicinity of 1730 cm$^{-1}$ and 1620 cm$^{-1}$, confirming that the product was a dimethylpolysiloxane-modified cationized cellulose, in which the dimethylpolysiloxane was bonded to the cationized cellulose through half ester groups represented by the formula:

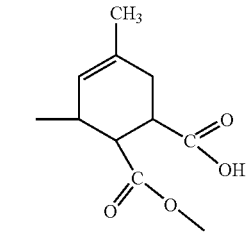

and/or half ester groups represented by the formula:

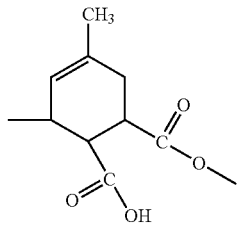

as well as by half ester groups represented by the formula:

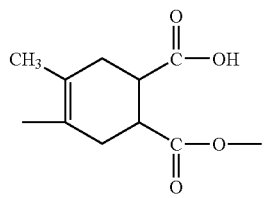

and/or half ester groups represented by the formula:

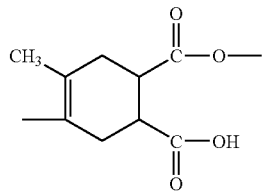

Fluorescent X-ray analysis found that the dimethylpolysiloxane content in the dimethylpolysiloxane-modified cationized cellulose was 2.88 wt % and the degree of substitution was $1.2 \times 10^{-2}$.

Application Example 5

First, 0.99 g of a white powder were obtained in the same manner as in Application Example 1, except that 0.05 g (residual carboxylic anhydride groups=0.039 millimol) of the dimethylpolysiloxane mixture prepared in Reference Example 6 were used in Application Example 1 instead of the dimethylpolysiloxane prepared in Reference Example 1. An IR analysis of the white powder found that peaks in the vicinity of 1790 $cm^{-1}$ and 1870 $cm^{-1}$, which were indicative of the residual carboxylic anhydride groups in the dimethylpolysiloxane mixture prepared in Reference Example 6, had disappeared and new peaks appeared in the vicinity of 1730 $cm^{-1}$ and 1620 $cm^{-1}$, confirming that the product was a dimethylpolysiloxane-modified cationized cellulose, in which the dimethylpolysiloxane was bonded to the cationized cellulose through half ester groups represented by the formula:

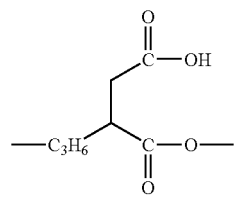

and/or half ester groups represented by the formula:

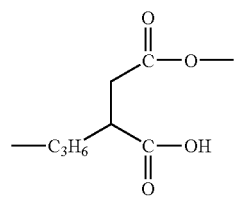

Fluorescent X-ray analysis found that the dimethylpolysiloxane content in the dimethylpolysiloxane-modified cationized cellulose was 1.55 wt % and the degree of substitution was $1.0 \times 10^{-2}$.

Application Example 6

First, 0.99 g of a white powder were obtained in the same manner as in Application Example 1, except that 0.05 g (residual carboxylic anhydride groups=0.039 millimol) of the dimethylpolysiloxane mixture prepared in Reference Example 7 were used in Application Example 1 instead of the dimethylpolysiloxane prepared in Reference Example 1. An IR analysis of the white powder found that peaks in the vicinity of 1790 $cm^{-1}$ and 1870 $cm^{-1}$, which were indicative of the residual carboxylic anhydride groups in the dimethylpolysiloxane mixture prepared in Reference Example 7, had disappeared and new peaks appeared in the vicinity of 1730 $cm^{-1}$ and 1620 $cm^{-1}$, confirming that the product was a dimethylpolysiloxane-modified cationized cellulose, in which the dimethylpolysiloxane was bonded to the cationized cellulose through half ester groups represented by the formula:

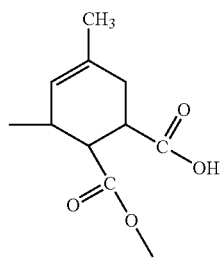

and/or half ester groups represented by the formula:

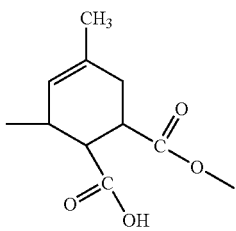

as well as by half ester groups represented by the formula:

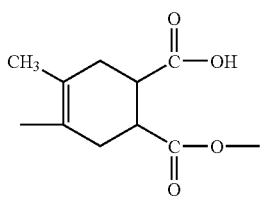

and/or half ester groups represented by the formula:

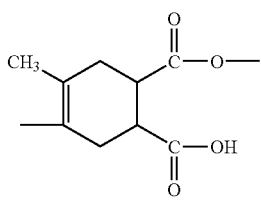

Fluorescent X-ray analysis found that the dimethylpolysiloxane content in the dimethylpolysiloxane-modified cationized cellulose was 0.67 wt % and the degree of substitution was $4.7 \times 10^{-3}$.

Application Example 7

First, 0.99 g of a white powder were obtained in the same manner as in Application Example 1, except that 0.05 g (residual carboxylic anhydride groups=0.039 millimol) of the dimethylpolysiloxane mixture prepared in Reference Example 8 were used in Application Example 1 instead of the dimethylpolysiloxane prepared in Reference Example 1. An IR analysis of the white powder found that peaks in the vicinity of 1790 cm$^{-1}$ and 1870 cm$^{-1}$, which were indicative of the residual carboxylic anhydride groups in the dimethylpolysiloxane mixture prepared in Reference Example 8, had disappeared and new peaks appeared in the vicinity of 1730 cm$^{-1}$ and 1620 cm$^{-1}$, confirming that the product was a dimethylpolysiloxane-modified cationized cellulose, in which the dimethylpolysiloxane was bonded to the cationized cellulose through half ester groups represented by the formula:

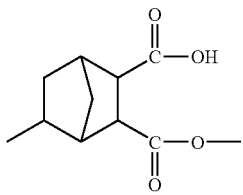

and/or half ester groups represented by the formula:

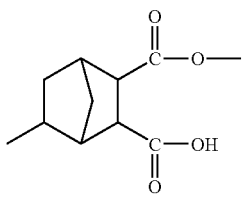

Fluorescent X-ray analysis found that the dimethylpolysiloxane content in the dimethylpolysiloxane-modified cationized cellulose was 1.14 wt % and the degree of substitution was $7.3 \times 10^{-3}$.

Application Example 8

First, 0.99 g of a white powder were obtained in the same manner as in Application Example 1, except that 0.05 g (residual carboxylic anhydride groups=0.069 millimol) of the organopolysiloxane prepared in Reference Example 9 were used in Application Example 1 instead of the dimethylpolysiloxane prepared in Reference Example 1. An IR analysis of the white powder found that peaks in the vicinity of 1790 cm$^{-1}$ and 1870 cm$^{-1}$, which were indicative of the residual carboxylic anhydride groups in the organopolysiloxane mixture prepared in Reference Example 9, had disappeared and new peaks appeared in the vicinity of 1730 cm$^{-1}$ and 1620 cm$^{-1}$, confirming that the product was an organopolysiloxane-modified cationized cellulose, in which the organopolysiloxane was bonded to the cationized cellulose through half ester groups represented by the formula:

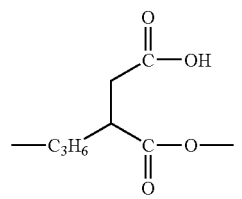

and/or half ester groups represented by the formula:

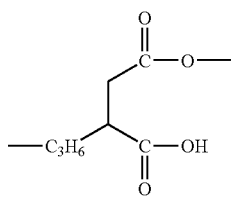

Fluorescent X-ray analysis found that the content of the organopolysiloxane in the organopolysiloxane-modified cationized cellulose was 0.7 wt % and the degree of substitution was $1.5 \times 10^{-2}$.

Application Example 9

First, 0.1 g of the dimethylpolysiloxane prepared in Reference Example 1 (residual carboxylic anhydride groups=0.085 millimol), 1.0 g of hydroxyethyl cellulose (a 2 wt % aqueous solution of which had a viscosity of between 200 mPa·s and 300 mPa·s at 20° C.), and 10 g of N,N-dimethylacetamide were mixed and the mixture was stirred for 3 hours at 40° C. After cooling, the mixture was combined with 20 milliliters of isopropyl alcohol and filtered. Then, 0.98 g of a pale brown laminar substance were obtained by thoroughly washing the filter cake with isopropyl alcohol and drying it in a vacuum oven. An IR analysis of the pale brown laminar substance found that peaks in the vicinity of 1790 cm$^{-1}$ and 1870 cm$^{-1}$, which were indicative of the residual carboxylic anhydride groups in the dimethylpolysiloxane prepared in Reference Example 1, had disappeared and new peaks appeared in the vicinity of 1730 cm$^{-1}$ and 1620 cm$^{-1}$, confirming that the product was a dimethylpolysiloxane-modified hydroxyethyl cellulose, in which the dimethylpolysiloxane was bonded to the hydroxyethyl cellulose through half ester groups represented by the formula:

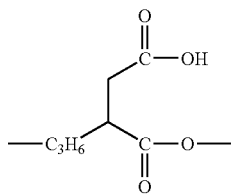

and/or half ester groups represented by the formula:

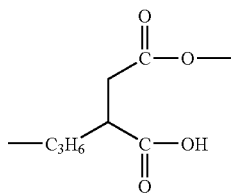

In addition, fluorescent X-ray analysis found that the dimethylpolysiloxane content in the dimethylpolysiloxane-modified hydroxyethyl cellulose was 1.47 wt % and the degree of substitution was $2.2 \times 10^{-3}$.

Application Example 10

First, 0.99 g of a pale brown laminar substance were obtained in the same manner as in Application Example 9, except that 1.0 g of hydroxypropyl cellulose (a 2 wt % aqueous solution of which had a viscosity of between 150 mPa·s and 400 mPa·s at 20° C.) was used in Application Example 9 instead of the hydroxyethyl cellulose. An IR analysis of the pale brown laminar substance found that peaks in the vicinity of 1790 cm$^{-1}$ and 1870 cm$^{-1}$, which were indicative of the residual carboxylic anhydride groups in the dimethylpolysiloxane prepared in Reference Example 1, had disappeared and new peaks appeared in the vicinity of 1730 cm$^{-1}$ and 1620 cm$^{-1}$, confirming that the product was a dimethylpolysiloxane-modified hydroxypropyl cellulose, in which the dimethylpolysiloxane was bonded to the hydroxypropyl cellulose through half ester groups represented by the formula:

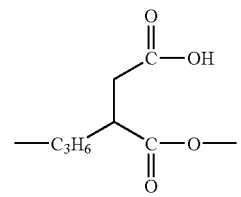

and/or half ester groups represented by the formula:

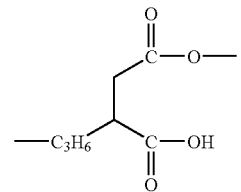

Fluorescent X-ray analysis found that the dimethylpolysiloxane content in the dimethylpolysiloxane-modified hydroxypropyl cellulose was 1.62 wt % and the degree of substitution was $2.6 \times 10^{-3}$.

Application Example 11

First, 0.98 g of a yellowish powder were obtained in the same manner as in Application Example 9, except that 1.0 g of chitosan (an aqueous solution of 0.5 wt % acetic acid and 0.5 wt % chitosan had a viscosity of between 5 mPa·s and 20 mPa·s at 20° C.; in addition, the degree of deacetylation was not less than 80.0 mol/mol %) was used in Application Example 9 instead of the hydroxyethyl cellulose. An IR analysis of the yellowish powder found that peaks in the vicinity of 1790 cm$^{-1}$ and 1870 cm$^{-1}$, which were indicative of the residual carboxylic anhydride groups in the dimethylpolysiloxane prepared in Reference Example 1, had disappeared and new peaks appeared in the vicinity of 1730 cm$^{-1}$ and 1620 cm$^{-1}$, confirming that the product was a dimethylpolysiloxane-modified chitosan, in which the dimethylpolysiloxane was bonded to the chitosan through half ester groups represented by the formula:

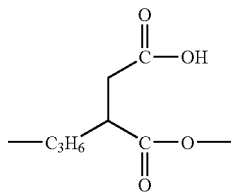

and/or half ester groups represented by the formula:

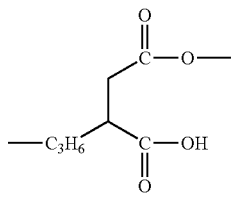

Fluorescent X-ray analysis found that the dimethylpolysiloxane content in the dimethylpolysiloxane-modified chitosan was 0.85 wt % and the degree of substitution was $9.1 \times 10^{-4}$.

Application Example 12

First, 0.99 g of a pale yellow powder were obtained in the same manner as in Application Example 7, except that 1.0 g of cationized guar gum (a 1 wt % aqueous solution of which had a viscosity of 3500 mPa·s at 20° C.) was used in Application Example 7 instead of the cationized cellulose. An IR analysis of the pale yellow powder found that peaks in the vicinity of 1790 cm$^{-1}$ and 1870 cm$^{-1}$, which were indicative of the residual carboxylic anhydride groups in the dimethylpolysiloxane prepared in Reference Example 8, had disappeared and new peaks appeared in the vicinity of 1730 cm$^{-1}$ and 1620 cm$^{-1}$, confirming that the product was a dimethylpolysiloxane-modified cationized guar gum, in which the dimethylpolysiloxane was bonded to the cationized guar gum through half ester groups represented by the formula:

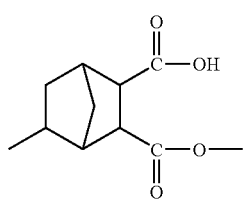

and/or half ester groups represented by the formula:

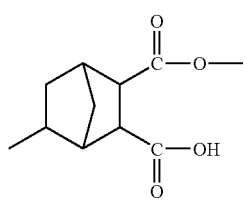

Fluorescent X-ray analysis found that the dimethylpolysiloxane content in the dimethylpolysiloxane-modified cationized guar gum was 0.94 wt % and the degree of substitution was $1.2 \times 10^{-3}$.

Comparative Example 1

First, 20 g of cationized cellulose (obtained by an addition reaction between hydroxyethyl cellulose and glycidyltrimethylammonium chloride) were dispersed in a solution containing 20 g water, 0.3 g sodium hydroxide, 8 g of an organopolysiloxane represented by the formula:

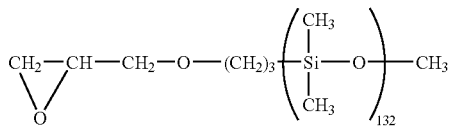

and 80 g isopropyl alcohol. A dispersion was prepared by stirring the solution for 5 hours under heating at 50° C., whereupon the dispersion was cooled to room temperature and filtered to recovering solid matter, which was then dissolved in 180 g water and the solution was neutralized. The product was precipitated by adding 500 milliliters of isopropyl alcohol and, after washing it with isopropyl alcohol, a white powder was obtained by drying. An IR analysis of the white powder found that it was a dimethylpolysiloxane-modified cationized cellulose, in which the dimethylpolysiloxane was bonded to the cationized cellulose through ether bonds. The average molecular weight of the dimethylpolysiloxane-modified cationized cellulose was about 150,000, the dimethylpolysiloxane content was 2.1 wt %, and the degree of substitution was $6.8 \times 10^{-4}$.

INDUSTRIAL APPLICABILITY

The organopolysiloxane-modified polysaccharide of the present invention, wherein the organopolysiloxane is bonded to the polysaccharide through half ester groups, is novel. And the process for the preparation of organopolysiloxane-modified polysaccharide of the present invention permits introduction of organopolysiloxane into the polysaccharide at a high introduction ratio without using toxic compounds such as isocyanate-containing organopolysiloxanes, etc.

Such organopolysiloxane-modified polysaccharide of the present invention is useful in a wide range of applications such as in papermaking, coatings, ceramics, construction, civil engineering, agriculture, aquaculture, fibers, food products, medicines, perfumery and cosmetics, and other fields as pressure-sensitive adhesives, dispersing agents, protective colloid agents, spreaders, thickeners, granulating agents, water-retaining agents, film-forming agents, carriers for functional components, etc.

The invention claimed is:

1. An organopolysiloxane-modified polysaccharide prepared by a process comprising the step of esterfication reacting:
   (A) an organopolysiloxane having residual carboxylic anhydride groups and having the formula selected from the group of;

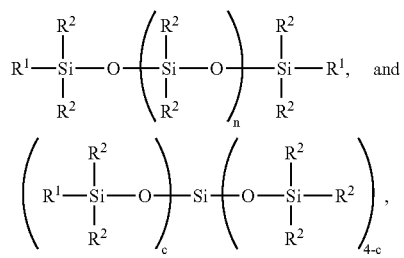

where $R^1$ is a monovalent organic group containing a residual carboxylic anhydride group,
$R^2$ is a hydrogen atom or monovalent hydrocarbon group, with the proviso that at least one $R^2$ is a monovalent hydrocarbon,
n is an integer greater than zero, and
c is an integer from 1 to 4; and
   (B) a polysaccharide having hydroxyl groups,
wherein the organopolysiloxane is bonded to the polysaccharide through half ester groups.

2. The organopolysiloxane-modified polysaccharide according to claim 1, wherein the residual carboxylic anhydride has a formula selected from the group of;

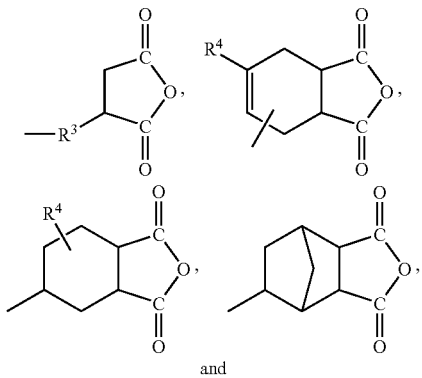

and

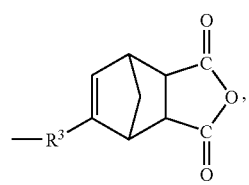

where $R^3$ is a divalent hydrocarbon group, and $R^4$ is a hydrogen atom or alkyl group.

3. The organopolysiloxane-modified polysaccharide according to claim 1, wherein the half ester group has a formula selected from the group of;

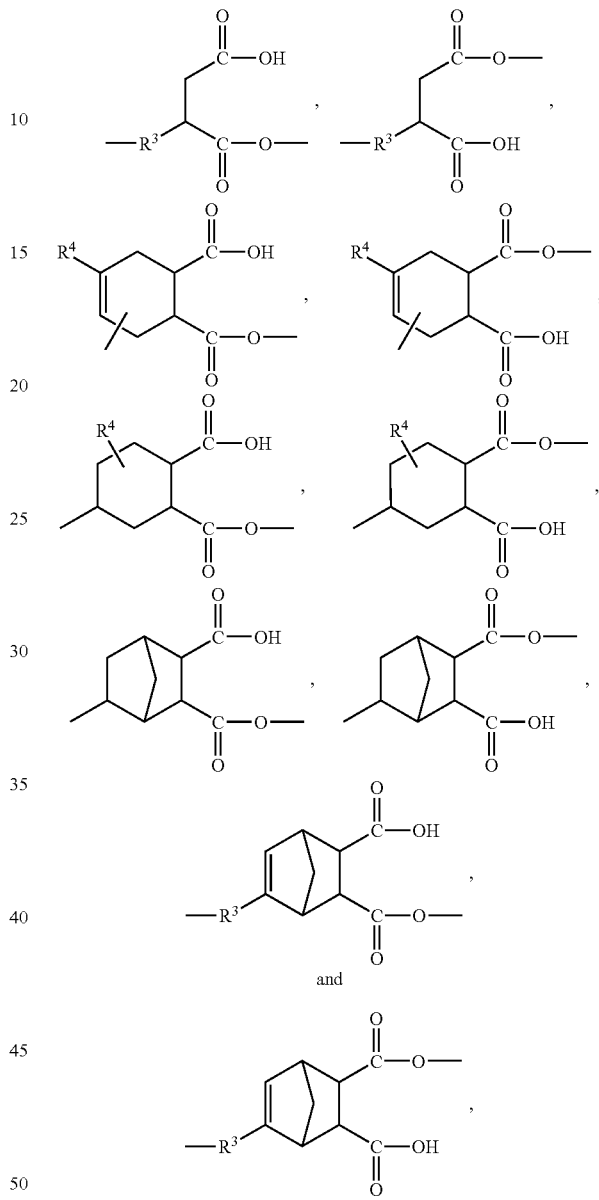

where $R^3$ is a divalent hydrocarbon group, and $R^4$ is a hydrogen atom or alkyl group.

4. The organopolysiloxane-modified polysaccharide according to claim 1, wherein component (B) is selected from the group of ligneous polysaccharides, polysaccharides obtained from fruit flesh and rhizome, plant adhesive substances, legume-derived polysaccharides, seaweed-derived polysaccharides, microorganism-produced polysaccharides, polysaccharides of animal origin, or a derivative of these polysaccharides.

5. The organopolysiloxane-modified polysaccharide according to claim 1, wherein components (A) and (B) are esterfication reacted in the presence of (C) a non-protonic polar solvent.

6. The organopolysiloxane-modified polysaccharide according to claim 5, wherein component (C) is N,N-dimethylacetamide, N,N-dimethylformamide, dimethyl sulfoxide, or hexamethylphosphortriamide.

7. A process for the preparation of organopolysiloxane-modified polysaccharide, said process comprising the step of esterification reacting:
(A) an organopolysiloxane having residual carboxylic anhydride groups and having the formula selected from the group of;

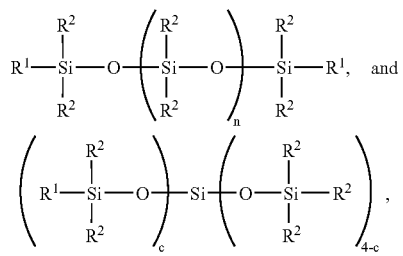

where $R^1$ is a monovalent organic group containing a residual carboxylic anhydride group,
$R^2$ is a hydrogen atom or monovalent hydrocarbon group, with the proviso that at least one a monovalent hydrocarbon,
n is an integer greater than zero, and
c is an integer from 1 to 4; and
(B) a polysaccharide having hydroxyl groups, in the presence of
(C) a non-protonic polar solvent.

8. The process for the preparation of organopolysiloxane-modified polysaccharide according to claim 7, wherein the residual carboxylic anhydride has a formula selected from the group of:

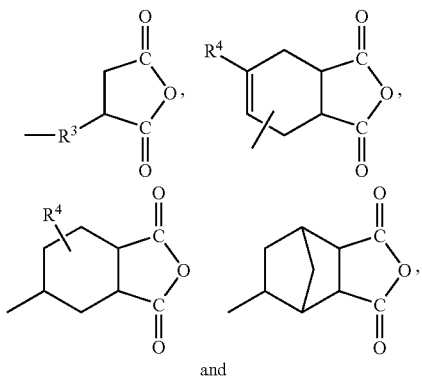

where $R^3$ is a divalent hydrocarbon group, and $R^4$ is a hydrogen atom or alkyl group.

9. The process for the preparation of organopolysiloxane-modified polysaccharide according to claim 7, wherein component (B) is selected from the group of ligneous polysaccharides, polysaccharides obtained from fruit flesh and rhizome, plant adhesive substances, legume-derived polysaccharides, seaweed-derived polysaccharides, microorganism-produced polysaccharides, polysaccharides of animal origin, or a derivative of these polysaccharides.

10. The process for the preparation of organopolysiloxane-modified polysaccharide according to claim 7, wherein component (C) is N,N-dimethylacetamide, N,N-dimethylformamide, dimethyl sulfoxide, or hexamethylphosphortriamide.

11. The process for the preparation of organopolysiloxane-modified polysaccharide according to claim 7, wherein the organopolysiloxane is bonded to the polysaccharide through half ester groups.

12. The process for the preparation of organopolysiloxane-modified polysaccharide according to claim 11, wherein the half ester group has a formula selected from the group of;

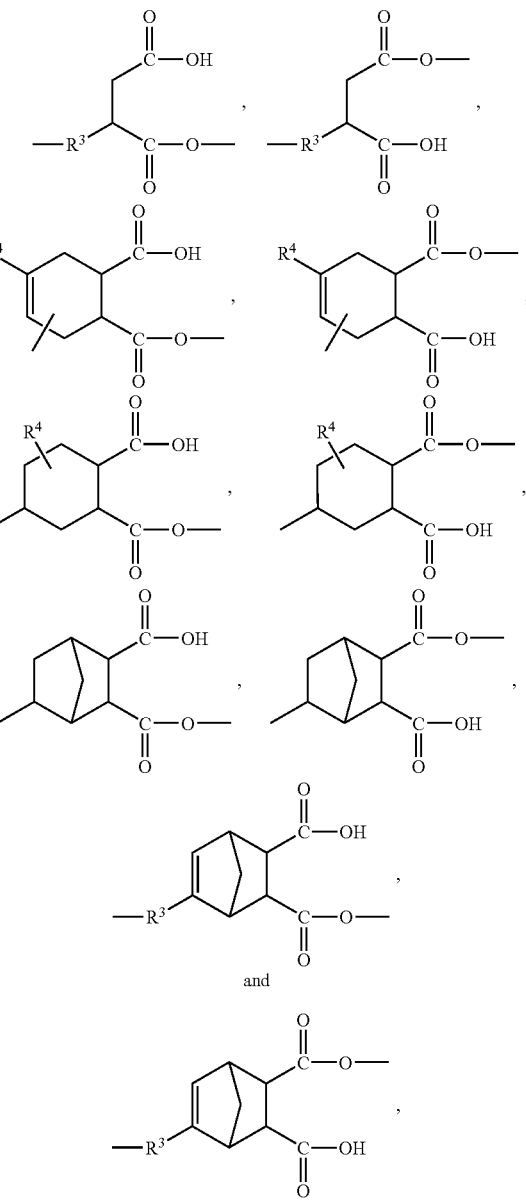

where $R^3$ is a divalent hydrocarbon group, and $R^4$ is a hydrogen atom or alkyl group.

* * * * *

UNITED STATES PATENT AND TRADEMARK OFFICE
CERTIFICATE OF CORRECTION

PATENT NO. : 7,199,205 B2 Page 1 of 1
APPLICATION NO. : 10/526729
DATED : April 3, 2007
INVENTOR(S) : Tadashi Okawa et al.

It is certified that error appears in the above-identified patent and that said Letters Patent is hereby corrected as shown below:

Column 31, line 27, after "one" insert --$R^2$ is--.

Signed and Sealed this

Eighteenth Day of December, 2007

JON W. DUDAS
*Director of the United States Patent and Trademark Office*